United States Patent
Kim et al.

(10) Patent No.: US 10,205,524 B2
(45) Date of Patent: Feb. 12, 2019

(54) METHOD AND APPARATUS FOR SETTING QUIET WINDOW IN PASSIVE OPTICAL NETWORK SYSTEM

(71) Applicant: ELECTRONICS AND TELECOMMUNICATIONS RESEARCH INSTITUTE, Daejeon (KR)

(72) Inventors: Geun Yong Kim, Gwangju (KR); Hark Yoo, Gwangju (KR); Sung Chang Kim, Gwangju (KR); Dongsoo Lee, Seongnam (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/461,214

(22) Filed: Mar. 16, 2017

(65) Prior Publication Data

US 2017/0279527 A1 Sep. 28, 2017

(30) Foreign Application Priority Data

Mar. 28, 2016 (KR) .................. 10-2016-0037180

(51) Int. Cl.
*H04B 10/27* (2013.01)
*H04J 14/02* (2006.01)
*H04B 10/079* (2013.01)

(52) U.S. Cl.
CPC ......... *H04B 10/27* (2013.01); *H04B 10/0795* (2013.01); *H04J 14/0227* (2013.01)

(58) Field of Classification Search
None
See application file for complete search history.

(56) References Cited

U.S. PATENT DOCUMENTS

| | | | | |
|---|---|---|---|---|
| 8,208,815 B1* | 6/2012 | Chiang | .................. | H04J 3/0682 398/155 |
| 8,712,242 B2 | 4/2014 | Zhang et al. | | |
| 8,948,401 B2 | 2/2015 | Kim et al. | | |
| 9,197,351 B2 | 11/2015 | Doo et al. | | |
| 2003/0063847 A1* | 4/2003 | BuAbbud | ........... | H04J 14/0226 385/24 |

(Continued)

FOREIGN PATENT DOCUMENTS

KR 10-0505129 B1 8/2005
KR 10-0945965 B1 3/2010

OTHER PUBLICATIONS

Jun Li et al., "Adaptive Registration in TWDM-PON With ONU Migrations", Opt. Commun. Netw., Nov. 2014, pp. 943-951, vol. 6, No. 11, Optical Society of America.

*Primary Examiner* — Casey Kretzer (57) ABSTRACT

A method and an apparatus for setting a quiet window in a passive optical network system are provided. A first response time from a time after an optical line terminal (OLT) transmits a serial number request up to a time in which the OLT receives a first response signal to the serial number request is measured, and a second response time up to a time in which the OLT receives a final response signal to the serial number request is measured. In addition, distance information of an optical network unit (ONU) including the first response time and the second response time is acquired.

15 Claims, 7 Drawing Sheets

(56) References Cited

U.S. PATENT DOCUMENTS

2010/0278533 A1* 11/2010 Julien ................ H04Q 11/0067
398/58
2010/0290784 A1* 11/2010 Mukai ............... H04L 12/40006
398/66
2013/0272699 A1 10/2013 Liang

* cited by examiner

METHOD AND APPARATUS FOR SETTING QUIET WINDOW IN PASSIVE OPTICAL NETWORK SYSTEM

CROSS-REFERENCE TO RELATED APPLICATION

This application claims priority to and the benefit of Korean Patent Application No. 10-2016-0037180 filed in the Korean Intellectual Property Office on Mar. 28, 2016, the entire contents of which are incorporated herein by reference.

BACKGROUND OF THE INVENTION (a) Field of the Invention

The present invention relates to a method and an apparatus for setting a quiet window in a passive optical network system.

(b) Description of the Related Art

In accordance with the development of optical communication technology and a rapid increase in the Internet service demand, a study on ultra-high speed large capacity optical subscriber network technology has been actively conducted. A passive optical network (PON) has a time division multiplexing (TDM) structure in which a plurality of optical network units (ONUs) are connected to one optical line terminal (OLT) through a passive element in a point-to-multipoint scheme. In the PON, an optical network terminal (ONT) registration process is required in order for the OLT to manage the ONUs connected thereto and allocate bands for an uplink traffic. To this end, the OLT allocates ONU-IDs, which are identifiers, to the respective ONUs. The registration process of the ONU includes a serial number acquisition process and a ranging process.

In the serial number acquisition process, when the OLT transmits a specific uplink bandwidth map to all the ONUs in a broadcast scheme, the ONUs transfer serial numbers together with random delay values used by the ONUs to the OLT through physical layer operations, administration and maintenance (PLOAM) messages after a random time delay. The random time delay prevents the PLOAM messages transmitted by a plurality of ONUs from being collided with each other. In this case, the transmitted specific uplink bandwidth map may be called a serial number request. When the OLT does not acquire the serial numbers of the ONUs due to collision generated between the PLOAM messages transmitted by the plurality of ONUs, the same operation is repeated in the next serial number acquisition process.

The OLT performs the ranging process individually on ONUs of which serial numbers are normally acquired, transmits an equalization delay value for temporally aligning the ONUs for the purpose of TDM transmission, and finishes the registration process.

Meanwhile, during the serial number acquisition process, a section in which the OLT transmits empty band allocation map information, such that uplink data of registered ONUs are not transmitted is called a quiet window. For a time corresponding to the quiet window, the ONUs that are registered and are served do not transmit traffics, but buffer the traffics. The OLT periodically generates a quiet window section in order to recognize existence of newly registered ONUs, and this period is not standardized in a standard document, but may be generally set to several milliseconds (ms) to several seconds (s).

A size of the quiet window section is associated with a distance at which the ONUs are positioned, and according to a standard specification, it has been recommended to use 250 μs in the case in which a differential distance (a distance difference between an ONU positioned at a position that is closest to the OLT and an ONU positioned at a position that is farthest from the OLT) is, for example, 20 km, and use 450 μs in the case in which the differential distance is 40 km. Therefore, when positions of the ONUs may be recognized, a time of the quiet window section may be reduced, and thus, buffering times of the ONUs that are being served may be shortened, thereby making it possible to improve quality of service (QoS).

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for setting a quiet window in a passive optical network system by acquiring distance information of optical network units (ONUs) in the passive optical network system.

An exemplary embodiment of the present invention provides a method for setting a quiet window in a passive optical network system, including: measuring a first response time from a time after an optical line terminal (OLT) transmits a serial number request up to a time in which the OLT receives a first response signal to the serial number request; measuring a second response time up to a time in which the OLT receives a final response signal to the serial number request; acquiring distance information of an optical network unit (ONU) including the first response time and the second response time; and adjusting the quiet window on the basis of the distance information of the ONU.

The method for setting a quiet window may be performed in a serial number acquisition process of the OLT, and the acquiring of the distance information of the ONU in the serial number acquisition process may be performed per set period.

In the adjusting of the quiet window, a time in which the quiet window is opened may be adjusted by adjusting times in which an empty and the serial number request are transmitted on the basis of the distance information of the ONU.

The adjusting of the quiet window may include: adjusting a time in which the OLT transmits the serial number request depending on a first time based on the first response time; and adjusting a time in which the OLT transmits the empty depending on a second time based on the second response time.

The first time may be calculated according to a condition of S=Clock_count T1−(max_random_delay+α), and the second time may be calculated according to a condition of E=Clock_count T2+(max_random_delay+α), where Clock_count T1 may indicate the number of clocks counted from a count start up to the first response time, Clock_count T2 may indicate the number of clocks counted from the count start up to the second response time, and α may indicate a delay time of the ONU.

The measuring of the first response time may include starting a count using clocks when a predetermined number of frames elapse and the quiet window is opened after the serial number request is transmitted; and measuring the first response time by clocks counted from a time in which the count is started up to a time in which the first response signal is received, and the measuring of the second response time may include measuring the second response time by clocks counted from the time in which the count is started up to a time in which the final response signal is received.

Another exemplary embodiment of the present invention provides a method for registering an ONU by an OLT in a passive optical network system, including: performing a serial number acquisition process in which the OLT transmits a serial number request and receives a response to the serial number request from the ONU; and performing a ranging process on ONUs of which serial numbers are acquired to transmit corresponding delay values to the ONUs, wherein the performing of the serial number acquisition process includes: measuring a first response time from a time in which the OLT transmits the serial number request up to a time in which the OLT receives a first response signal; measuring a second response time up to a time in which the OLT receives a final response signal to the serial number request; acquiring distance information of the ONU including the first response time and the second response time; and adjusting a quiet window on the basis of the distance information of the ONU.

The adjusting of the quiet window may include: adjusting a time in which the OLT transmits the serial number request depending on a first time based on the first response time; and adjusting a time in which the OLT transmits an empty depending on a second time based on the second response time.

The first time may be calculated according to a condition of S=Clock_count T1−(max_random_delay+α), and the second time may be calculated according to a condition of E=Clock_count T2+(max_random_delay+α), where Clock_count T1 may indicate the number of clocks counted from a count start up to the first response time, Clock_count T2 may indicate the number of clocks counted from the count start up to the second response time, and α may indicate a delay time of the ONU.

Yet another exemplary embodiment of the present invention provides an apparatus for setting a quiet window in a passive optical network system, including: a signal transceiver transmitting and receiving an optical signal through an antenna; and a processor connected to the signal transceiver and executing setting of the quiet window, wherein the processor is configured to measure a first response time from a time after a serial number request is transmitted up to a time in which a first response signal to the serial number request is received, measure a second response time up to a time in which a final response signal to the serial number request is received, and adjust the quiet window on the basis of distance information of an ONU including the first response time and the second response time.

The processor may be configured to perform acquisition of the distance information of the ONU in a serial number acquisition process of an OLT per set period.

The processor may be configured to adjust a time in which the quiet window is opened by adjusting times in which an empty and the serial number request are transmitted on the basis of the distance information of the ONU.

The processor may be configured to adjust a time in which the OLT transmits the serial number request depending on a first time based on the first response time and adjust a time in which the OLT transmits the empty depending on a second time based on the second response time.

The first time may be calculated according to a condition of S=Clock_count T1−(max_random_delay+α), and the second time may be calculated according to a condition of E=Clock_count T2+(max_random_delay+α), where Clock_count T1 may indicate the number of clocks counted from a count start up to the first response time, Clock_count T2 may indicate the number of clocks counted from the count start up to the second response time, and α may indicate a delay time of the ONU.

The processor may be configured to start a count using clocks when a predetermined number of frames elapse and the quiet window is opened after the serial number request is transmitted, measure the first response time by clocks counted from a time in which the count is started up to a time in which the first response signal is received, and measure the second response time by clocks counted from the time in which the count is started up to a time in which the final response signal is received.

According to an exemplary embodiment of the present invention, in a passive optical network (PON) system, an OLT measures times until uplink signals by which an ONU positioned at a position closest to the OLT and an ONU positioned at a position farthest from the OLT respond are received and adjusts a time in which a quiet window is opened on the basis of the measured times in a serial number acquisition process, thereby reducing a transmission delay time of uplink traffics and reducing an amount of packets that need to be buffered by ONUs that are being served to improve a quality of service (QoS).

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, unless explicitly described to the contrary, the word "comprise" and variations such as "comprises" or "comprising", will be understood to imply the inclusion of stated elements but not the exclusion of any other elements.

Hereinafter, a method and an apparatus for setting a quiet window section according to an exemplary embodiment of the present invention will be described with reference to the accompanying drawings.

Figure 1:
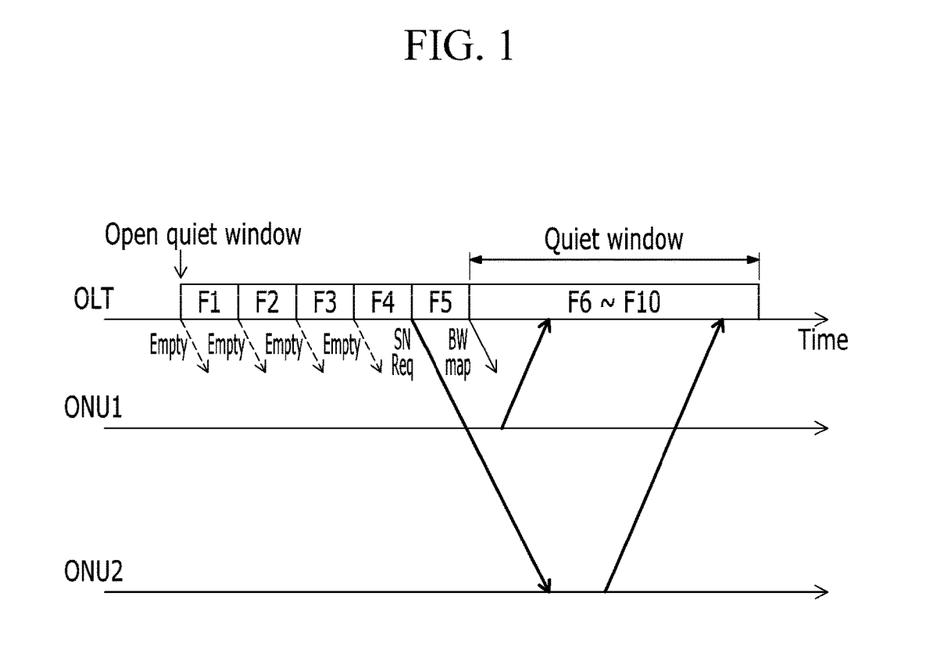
FIG. 1 is a view showing a serial number acquisition process.

FIG. 1 is a view showing a serial number acquisition process.

In a passive optical network (PON) such as a time and wavelength division multiplexing passive optical network (TWDM-PON) system, an optical line terminal (OLT) performs an optical network terminal (ONT) registration process in order to manage optical network units (ONUs) connected thereto and allocate bands for an uplink traffic, and the registration process includes a serial number acquisition process and a ranging process.

In the serial number acquisition process, in the case in which a differential distance, which is a distance difference between an ONU positioned at a position that are closest to the OLT and an ONU positioned at a position that are farthest from the OLT, is long (for example, 40 km), the OLT does not transmit a band allocation map for several downlink frames F6 to F10 depending on setting of a quiet window section based on the differential distance, and transmits a band allocation map, that is, a serial number request bandwidth map in the next frame, when an operation of opening a quiet window starts, as shown in FIG. 1. This is to receive only Serial_Number_ONU physical layer operations, administration and maintenance (PLOAM) messages of the ONUs for the serial number request for the quiet window section. In this case, since distances at which ONU1 and ONU2 are positioned are different from each other, the OLT may receive responses from the two ONUs, that is, PLOAM messages including serial numbers together with random delay values used by corresponding ONUs, between frame 6 F6 and frame 10 F10. In FIG. 1, even in the quiet window section, the band allocation map for ONUs that are being serviced may be transmitted in a downlink direction (a direction in which the OLT transmits signals to the ONUs), which is not shown in FIG. 1 for convenience of explanation.

However, generally, the ONUs are positioned at a similar distance in many cases in the PON, and this feature is remarkable particularly in nations in which the number of apartments is many. In this situation, a serial number acquisition process as shown in FIG. 2 is performed.

Figure 2:
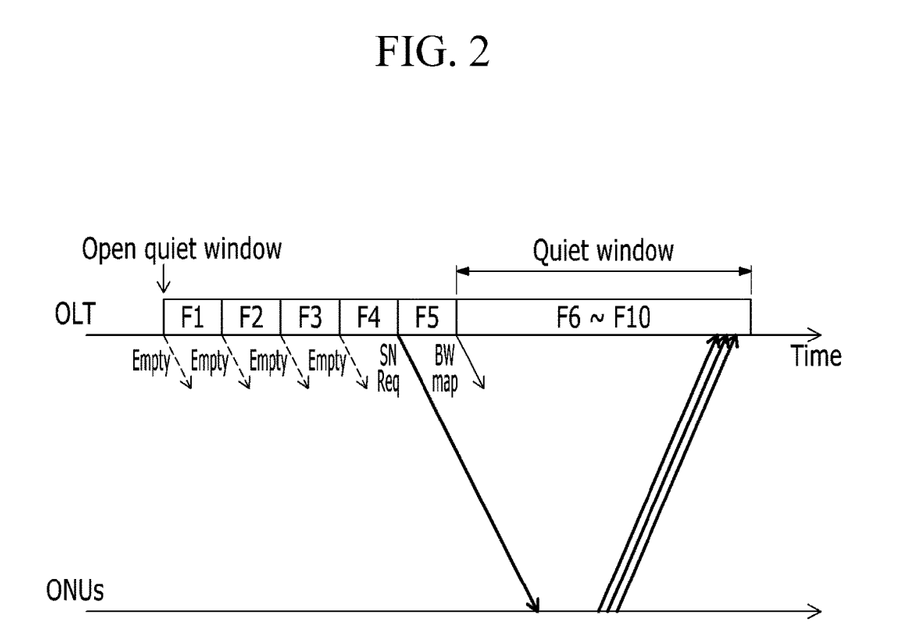
FIG. 2 is a view showing another serial number acquisition process.

FIG. 2 is a view showing another serial number acquisition process.

In the case in which the differential distance is short in the serial number acquisition process, responses of the ONUs to a serial number request transmitted in frame 4 F4 are not evenly distributed in frame 6 F6 to frame 10 F10, as shown in FIG. 1, but are distributed between frame 9 F9 and frame 10 F10, as shown in FIG. 2. Therefore, frame 6 F6 to frame 8 F8 may be considered as waste regions.

However, when the OLT recognizes that the responses of the ONUs to the serial number request will arrive between frame 9 F9 and frame 10 F10, band allocation map information rather than an empty may be transmitted in frame 1 F1 to frame 3 F3.

In an exemplary embodiment of the present invention, information on a distance at which the responses of the ONUs may arrive is calculated in the serial number acquisition process in order to minimize empty regions that may be wasted in the serial number acquisition process. For convenience of explanation, the information on the distance at which the responses of the ONUs may arrive is called "ONU distance information". The ONU distance information is used for a band allocation policy of dynamic bandwidth allocation (DBA) in order to reduce a size of a quiet window.

Figure 3:
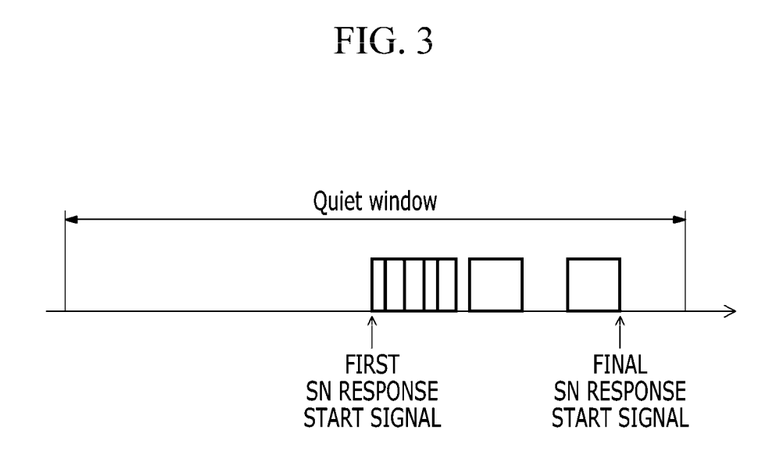
FIG. 3 is a view showing uplink signal detection of an optical line terminal (OLT) according to an exemplary embodiment of the present invention.

FIG. 3 is a view showing uplink signal detection of an OLT according to an exemplary embodiment of the present invention.

As shown in FIG. 3, responses of the ONUs to the serial number request may be received in a quiet window section. In the responses of the ONUs arriving in the quiet window section, collision may be generated due to a random delay or may not be generated. A media access control (MAC) of the OLT may receive a report for an uplink signal (a signal transmitted from the ONU to the OLT) when the uplink signal is received from an optical module. Therefore, when the quiet window is opened and information in a section in which the signal is present may be recognized, a minimum size of the quiet window section for receiving the uplink signal may be calculated.

To this end, in an exemplary embodiment of the present invention, the ONU distance information is calculated.

Figure 4:
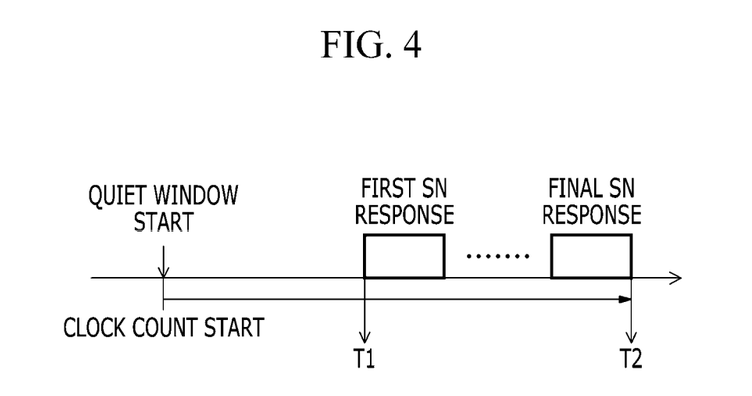
FIG. 4 is a view showing an optical network unit (ONU) distance information calculation process based on uplink signal detection according to an exemplary embodiment of the present invention.
Figure 5:
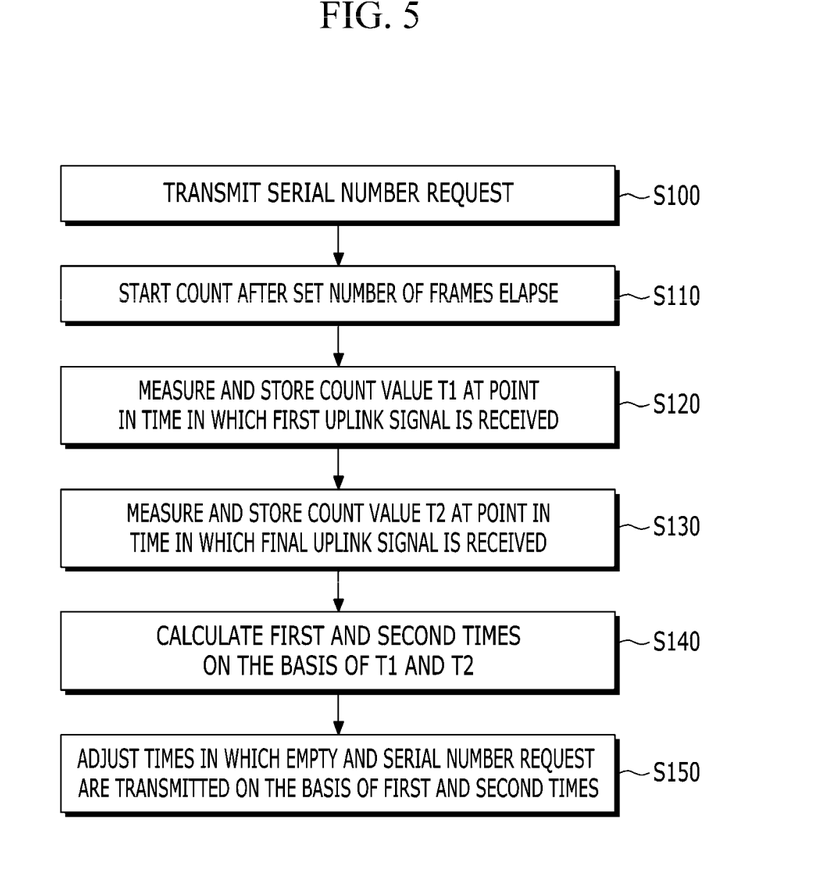
FIG. 5 is a flowchart of a method for setting a quiet window based on a distance information calculation process according to an exemplary embodiment of the present invention.

FIG. 4 is a view showing an ONU distance information calculation process based on uplink signal detection according to an exemplary embodiment of the present invention, and FIG. 5 is a flowchart of a method for setting a quiet window based on a distance information calculation process according to an exemplary embodiment of the present invention.

When the serial number acquisition process is started, the OLT transmits an empty and a band allocation map, that is, a serial number request SN request (S100) as shown in FIGS. 4 and 5 in order to open the quiet window section as shown in FIGS. 1 and 2. When any number of frames elapse and the quiet window is opened, the OLT starts a count using a clock used in an inner portion thereof (S110), as shown in FIG. 4. When a first uplink signal, that is, an uplink signal (an SN response), which is a response to the serial number request, is received after the count is started, a count value at a point in time in which the first uplink signal is received is stored (S120). The count value corresponding to the point in time in which the first uplink signal is received is called T1. Then, the count is continuously performed until a final uplink signal is received. In addition, a count value at a point in time in which the final uplink signal is received is stored (S130), and particularly, a count value at a point in time corresponding to a falling portion of the final uplink signal is stored and is called T2. Since a difference between T1 and T2 indicates distance information of an ONU positioned at the closest position and an ONU positioned at the farthest position, it may be appreciated that the difference means a differential distance. As described above, the ONU distance information including a time T1 until an uplink signal by which the ONU positioned at the closest position responds is received and a time T2 until an uplink signal by which the ONU positioned at the farthest position responds is received is acquired.

Then, S and E are calculated on the basis of values of T1 and T2 and a maximum random delay value as follows (S140).

$$S=\text{Clock\_count}(T1)-(\text{max\_random\_delay}+\alpha)$$

$$E=\text{Clock\_count}(T2)+(\text{max\_random\_delay}+\alpha) \quad \text{(Equation 1)}$$

Here, Clock_count T1 indicates a count value corresponding to the point in time in which the first uplink signal is received, that is, the number of clocks counted up to a point T1, and Clock_count T2 indicates a count value corresponding to the point in time in which the final uplink signal is received, that is, the number of clocks counted up to a point T2. $\alpha$ indicates other ONU system delay time including a response time of the ONUs, and the like. The maximum random delay value max_random_delay may be preset.

S is a first time based on a difference between T1 and the maximum random delay value, and E is a second time based on the sum of T2 and the maximum random delay value. Since the first uplink signal may become fast by max_random_delay+$\alpha$ and the final uplink signal may become slow by max_random_delay+$\alpha$, the first time S and the second time E are calculated according to the above Equation 1.

Then, when a process of opening the quiet window is started, the OLT adjusts times in which the empty and the serial number request (the SN request map) are transmitted on the basis of the first time S and the second time E to open the quiet window (S150). That is, the OLT adjusts the time in which the serial number request is transmitted depending on the first time S, adjusts the time in which the empty is transmitted depending on the second time E, and opens the quiet window section on the basis of the adjusted times in which the empty and the serial number request are transmitted. Therefore, the quiet window section is adjusted.

Figure 6:
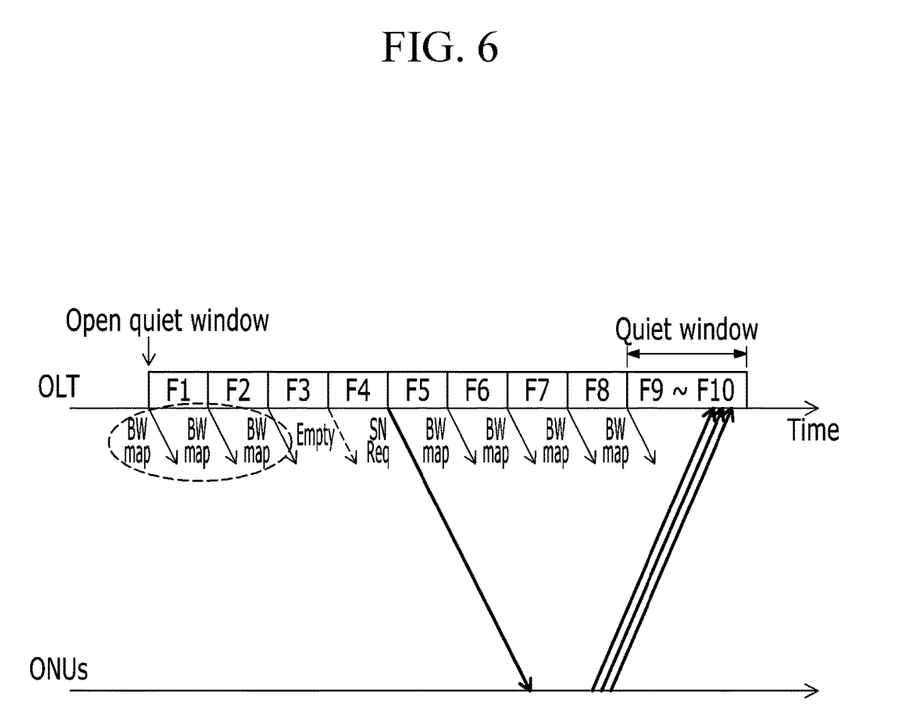
FIG. 6 is a view showing a serial number acquisition process according to an exemplary embodiment of the present invention.

FIG. 6 is a view showing a serial number acquisition process according to an exemplary embodiment of the present invention. Particularly, FIG. 6 shows a serial number acquisition process performed after the distance information of the ONU is acquired as described above.

The OLT adjusts the times in which the empty and the serial number request (the SN request map) are transmitted on the basis of the first time S and the second time E, thereby making it possible to transmit the band allocation map rather than the empty even in frame 1 F1 to frame 3 F3, as shown in FIG. 5. Therefore, an opportunity in which uplink packets of the ONUs that are being served may be transmitted without being buffered is further increased.

A distance information acquisition process of the ONUs performed in the serial number acquisition process is performed per predetermined period by the OLT. After the distance information acquisition process of the OLT ends, when a new ONU responds to the serial number request in order to attempt registration, a response signal of the ONU may arrive in a section outside a quiet window section predicted by the OLT. Therefore, the distance information acquisition process of the ONUs is repeatedly performed periodically.

Figure 7:
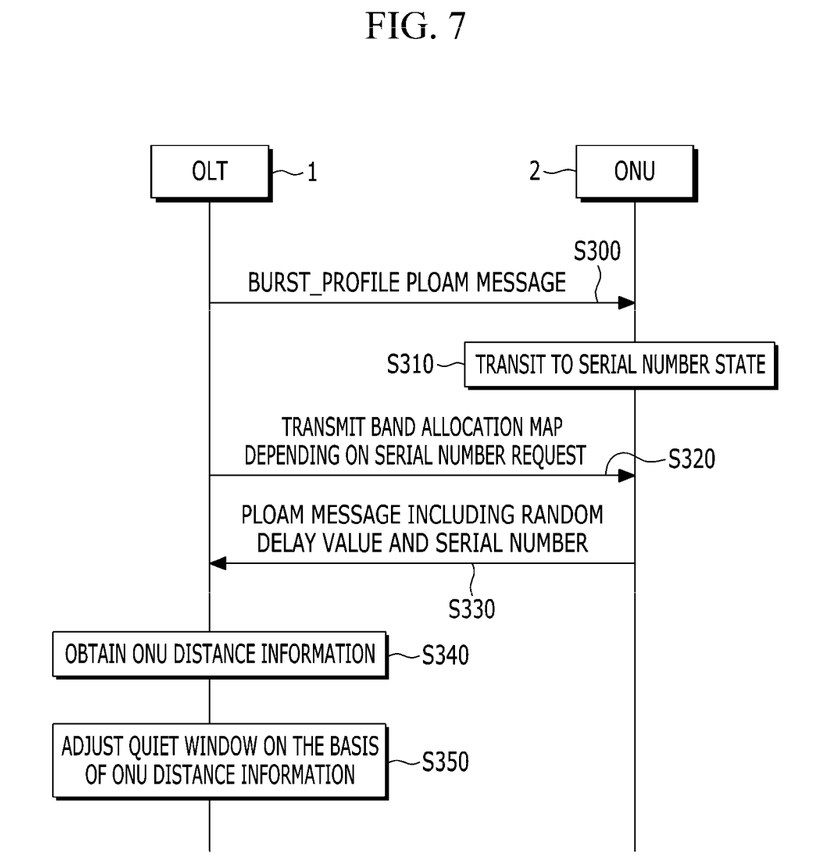
FIG. 7 is a flowchart showing a serial number acquisition process according to an exemplary embodiment of the present invention.

In an exemplary embodiment of the present invention, the serial number acquisition process that may be performed by the OLT and the ONUs is performed as shown in FIG. 7.

FIG. 7 is a flowchart showing a serial number acquisition process according to an exemplary embodiment of the present invention.

As shown in FIG. 7, the OLT 1 first transmits a Burst_profile PLOAM message (S300). The ONUs receiving the Burst_profile PLOAM message transit their operation stations into a serial number state for responding to a serial number request transmitted by the OLT (S310). Then, the OLT performs a serial number acquisition process through transmission of a band allocation map depending on the serial number request (S320). In this case, as described above, distance information acquisition is performed on the basis of the responses from the ONUs (S330 and S340). That is, the OLT calculates a time T1 in which a response of the ONU positioned at the closest position arrives through a clock count up to a point in time in which the first uplink signal is received, and calculates a time T2 in which a response of the ONU positioned at the farthest position arrives through a clock count up to a point in time in which the final uplink signal is received. Then, the OLT adjusts the times in which the empty and the serial number request are transmitted on the basis of T1 and T2 (S350).

The OLT does not transmit the Burst_profile PLOAM message for a set time T (S340). Here, T may be set to a time of M frames (125 µs×M). New ONUs turned on during a period in which S300 to S310 are performed are in an initial state, such that they do not respond to the serial number request performed in S320.

Meanwhile, the OLT repeats S300 to S350 after a set number of frames (M frames) elapse. Therefore, the new ONUs turned on during the period in which S300 to S310 are performed may perform a registration process.

Figure 8:
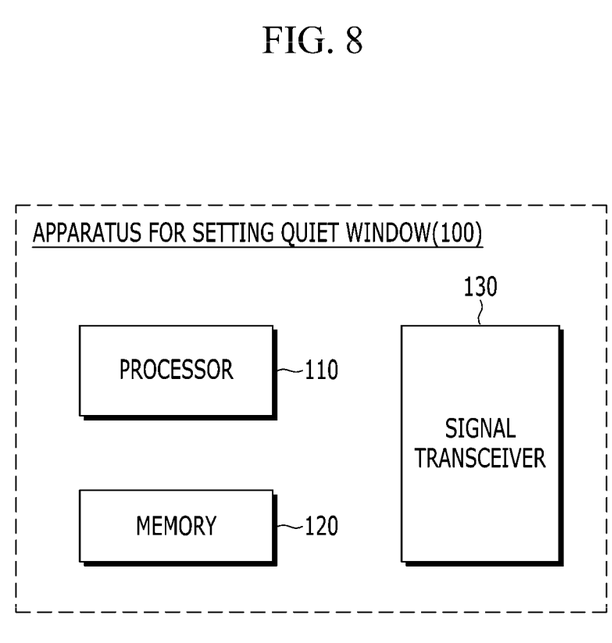
FIG. 8 is a block diagram of an apparatus for setting a quiet window according to an exemplary embodiment of the present invention.

FIG. 8 is a block diagram of an apparatus for setting a quiet window according to an exemplary embodiment of the present invention.

As shown in FIG. 8, the apparatus 100 for setting a quiet window according to an exemplary embodiment of the present invention includes a processor 110, a memory 120, and a signal transceiver 130. The processor 110 may be configured to implement the methods described with reference to FIGS. 3 to 7.

The memory 120 is connected to the processor 110, and stores various kinds of information related to operations of the processor 110 therein. The signal transceiver 130 is connected to the processor 110, and transmits or receives signals, particularly, optical signals.

The exemplary embodiments of the present invention described above are not implemented through only the apparatus and/or the method described above, but may also be implemented through programs executing functions corresponding to configurations of the exemplary embodiments of the present invention, a recording medium in which the programs are recorded, and the like. In addition, these implementations may be easily made by those skilled in the art to which the present invention pertains from the exemplary embodiments described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for setting a quiet window in a passive optical network system, comprising:

measuring a first response time from a time after an optical line terminal (OLT) transmits a serial number request up to a time in which the OLT receives a first response signal to the serial number request;

measuring a second response time up to a time in which the OLT receives a final response signal to the serial number request; and adjusting the quiet window on the basis of distance information of the an Optical Network Unit (ONU) including the first response time and the second response time, wherein the adjusting of the quiet window includes:

adjusting a time in which the OLT transmits the serial number request by using the first response time; and adjusting a time in which the OLT transmits an empty by using the second response time.

2. The method for setting a quiet window of claim 1, wherein:
the method for setting a quiet window is performed in a serial number acquisition process of the OLT, and the measuring of the first response time and the second response time in the serial number acquisition process is performed per set period.

3. The method for setting a quiet window of claim 1, wherein:
in the adjusting of the quiet window, a time in which the quiet window is opened is adjusted by adjusting times in which the empty and the serial number request are transmitted on the basis of the distance information of the ONU.

4. The method for setting a quiet window of claim 1, wherein:
the adjusting of the time in which the OLT transmits the serial number request by using the first response time includes:
adjusting the time in which the OLT transmits the serial number request depending on a first time calculated by using the first response time; and
adjusting of the time in which the OLT transmits an empty by using the second response time includes adjusting a time in which the OLT transmits the empty depending on a second time calculated by using the second response time.

5. The method for setting a quiet window of claim 4, wherein:
the first time is calculated according to a condition of S=Clock_count T1−(max_random_delay+α), and the second time is calculated according to a condition of E=Clock_count T2+(max_random_delay+α), where Clock_count T1 indicates a first count value of a count using a clock counted from a count start up to the first response time, Clock_count (T2) indicates a second count value of the count counted from the count start up to the second response time, and α indicates a delay time of the ONU.

6. The method for setting a quiet window of claim 1, wherein:
the measuring of the first response time includes:
starting a count using a clock when a predetermined number of frames elapse and the quiet window is opened after the serial number request is transmitted; and
measuring the first response time using a first count value of the count counted from a time in which the count is started up to a time in which the first response signal is received, and
the measuring of the second response time includes measuring the second response time using a second count value of the count counted from the time in which the count is started up to a time in which the final response signal is received.

7. A method for registering an Optical Network Unit (ONU) by an Optical Line Termination (OLT) in a passive optical network system, comprising:
performing a serial number acquisition process in which the OLT transmits a serial number request and receives a response to the serial number request from the ONU; and
performing a ranging process on ONUs of which serial numbers are acquired to transmit corresponding delay values to the ONUs, wherein the performing of the serial number acquisition process includes:
measuring a first response time from a time in which the OLT transmits the serial number request up to a time in which the OLT receives a first response signal;
measuring a second response time up to a time in which the OLT receives a final response signal to the serial number request;
and
adjusting a quiet window on the basis of distance information of an Optical Network Unit (ONU) including the first response time and the second response time,
wherein the adjusting of the quiet window includes:
adjusting a time in which the OLT transmits the serial number request by using the first response time; and
adjusting a time in which the OLT transmits an empty by using the second response time.

8. The method for registering an ONU of claim 7, wherein:
the adjusting of the time in which the OLT transmits the serial number request by using the first response time includes:
adjusting the time in which the OLT transmits the serial number request depending on a first time calculated by using the first response time; and
adjusting the time in which the OLT transmits the empty by using the second response time includes adjusting the time in which the OLT transmits the empty depending on a second time calculated by using the second response time.

9. The method for registering an ONU of claim 8, wherein:
the first time is calculated according to a condition of S=Clock_count T1−(max_random_delay+α), and the second time is calculated according to a condition of E=Clock_count T2+(max_random_delay+α), where Clock_count T1 indicates a first count value of a count using a clock counted from a count start up to the first response time, Clock_count T2 indicates a second count value of the count counted from the count start up to the second response time, and α indicates a delay time of the ONU.

10. An apparatus for setting a quiet window in a passive optical network system, comprising:
a signal transceiver transmitting and receiving an optical signal; and
a processor connected to the signal transceiver and executing setting of the quiet window,
wherein the processor is configured to
measure a first response time from a time after a serial number request is transmitted up to a time in which a first response signal to the serial number request is received,
measure a second response time up to a time in which a final response signal to the serial number request is received, and
adjust the quiet window on the basis of distance information of an Optical Network Unit (ONU) including the first response time and the second response time, and
wherein the processor is configured to adjust a time in which the Optical Line Termination (OLT) transmits the serial number request by using the first response time and adjust a time in which the OLT transmits an empty by using the second response time.

11. The apparatus for setting a quiet window of claim 10, wherein:
the processor is configured to perform acquisition of the distance information of the ONU in a serial number acquisition process of an Optical Line Termination (OLT) per set period.

12. The apparatus for setting a quiet window of claim 10, wherein:
the processor is configured to adjust a time in which the quiet window is opened by adjusting times in which the empty and the serial number request are transmitted on the basis of the distance information of the ONU.

13. The apparatus for setting a quiet window of claim 10, wherein:
the processor is configured to adjust the time in which the OLT transmits the serial number request depending on a first time calculated by using the first response time and adjust the time in which the OLT transmits the empty depending on a second time calculated by using the second response time.

14. The apparatus for setting a quiet window of claim 13, wherein:
the first time is calculated according to a condition of S=Clock_count T1−(max_random_delay+α), and the second time is calculated according to a condition of E=Clock_count T2+(max_random_delay+α), where Clock_count T1 indicates a first count value of a count using a clock counted from a count start up to the first response time, Clock_count T2 indicates a second count value of the count counted from the count start up to the second response time, and α indicates a delay time of the ONU.

15. The apparatus for setting a quiet window of claim 10, wherein:
the processor is configured to start a count using a clock when a predetermined number of frames elapse and the quiet window is opened after the serial number request is transmitted, measure the first response time using a first count value of the count counted from a time in which the count is started up to a time in which the first response signal is received, and measure the second response time using a second count value of the count counted from the time in which the count is started up to a time in which the final response signal is received.

* * * * *